United States Patent
Torsner et al.

(10) Patent No.: US 7,194,267 B2
(45) Date of Patent: Mar. 20, 2007

(54) TRANSPORT CHANNEL CONTROL IN A UMTS NETWORK

(75) Inventors: Johan Torsner, Jorvas (FI); Raul Söderström, Kyrkslätt (FI); Mikael Winberg, Helsinki (FI); Osmo Pulkkinen, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 818 days.

(21) Appl. No.: 10/398,019

(22) PCT Filed: Sep. 26, 2001

(86) PCT No.: PCT/IB01/02089

§ 371 (c)(1),
(2), (4) Date: Mar. 28, 2003

(87) PCT Pub. No.: WO02/31916

PCT Pub. Date: Apr. 18, 2002

(65) Prior Publication Data

US 2003/0186700 A1    Oct. 2, 2003

(30) Foreign Application Priority Data

Oct. 10, 2000    (GB) ................................ 0024763.5

(51) Int. Cl.
*H04Q 7/20*    (2006.01)

(52) U.S. Cl. ...................... 455/442; 370/324; 370/341; 370/348; 370/503; 370/509; 370/510; 370/512

(58) Field of Classification Search ................ 455/442; 370/324, 341, 348, 503, 509, 510, 512
See application file for complete search history.

(56) References Cited

U.S. PATENT DOCUMENTS 5,258,980 A    11/1993    Maebara et al. ........... 370/95.1

FOREIGN PATENT DOCUMENTS

| JP | 11289585 | 10/1999 |
|----|----------|---------|
| WO | WO 96/08940 | 3/1996 |
| WO | WO 00 16504 | 3/2000 |

OTHER PUBLICATIONS

Shorthouse, R., Search Report for GB 0024763.5 on Jun. 28, 2001.

*Primary Examiner*—Quynh H. Nguyen

(57) ABSTRACT

A method of switching from a first to a second transport channel for User Equipment (UE) in a UMTS Terrestrial Radio Access Network (UTRAN) of a UMTS system. The method comprises initiating a channel switch, and initiating a synchronisation of the UE to the second channel. The first channel is maintained during the synchronisation phase such that data may be sent between the UE and UTRAN over the first channel during synchronisation. The first channel is terminated only after synchronisation of the UE to the second channel has been achieved.

3 Claims, 5 Drawing Sheets

TRANSPORT CHANNEL CONTROL IN A UMTS NETWORK

FIELD OF THE INVENTION

The present invention relates to transport channel control in a Universal Mobile Telecommunications System (UMTS) network and more particularly to reducing the disruption caused to data transmission as a result of switching between different physical WCDMA Layer 1 transport channels.

BACKGROUND TO THE INVENTION

The European Telecommunications Standardisation Institute (ETSI) is currently in the process of standardising a new set of protocols for mobile telecommunications systems. The set of protocols is known collectively as the Universal Mobile Telecommunications System (UMTS). This third generation standard is also often referred to as 3GPP.

FIG. 1 illustrates schematically a UMTS network 1 which comprises a core network 2 and a UMTS Terrestrial Radio Access Network (UT 3. The UTRAN 3 comprises a number of Radio Network Controllers (RNCs) 4, each of which is coupled to a set of neighbouring Base Transceiver Stations (BTSs) 5. BTSs are sometimes referred to as Node Bs. Each Node B 5 is responsible for a given geographical cell and the controlling RNC 4 is responsible for routing user and signalling data between that Node B 5 and the core network 2. All of the RNCs are coupled to one another. A general outline of the UTRAN 3 is given in Technical Specification TS 25.401 V2.0.0 (1999-09) of the 3rd Generation Partnership Project, ETSI.

User and signalling data is carried between an RNC and a mobile terminal (referred to in UTRAN as User Equipment (UE)) using Radio Access Bearers (RABs). Typically, a UE is allocated one or more Radio Access Bearers (RABs) each of which is capable of carrying a flow of user or signalling data. RABs are mapped onto respective logical channels. At the Media Access Control (WAC) layer, a set of logical channels is mapped in turn onto a transport channel, of which there are two types: a "common" transport channel which is shared by different mobile terminals and a "dedicated" transport channel which is allocated to a single mobile terminal. One type of common channel is a Forward Access CHannel (FACH) which carries data in the downlink direction. Another type of common channel is the Random Access Channel (RAC) which carries data in the uplink direction. Several transport channels are in turn mapped at the physical layer onto a Secondary Common Control Physical CHannel (S-CCPCH) for transmission over the air interface between a Node B and a UE.

FIG. 2 illustrates certain of the layers present at a UE, a Node B, and an RNC of a UMTS network. In particular, FIG. 1 illustrates that the MAC layer, present at the RNC and the UE, is split into a MAC-c layer and a MAC-d layer.

Following the establishment of a user connection between a UE and the network, the network may decide to switch the connection from one channel type to another channel type. For example, a decision may be made to switch from a FACH/RACH channel to a DCH. The decision to switch is made by the MAC-c entity of the RNC. Upon allocation of a new channel, it is necessary for the WCDMA L1 layer of the UE to synchronise to the new (DCH) channel. Synchronisation makes use of one or more idle frames, or frames containing user data, sent to the UE. Once synchronisation has occurred, received frames are forwarded to the higher (L2) layers of the UE.

According to the current UMTS proposals, during this synchronisation phase, the MAC-d entity of the RNC may send user data to the Node B and the Node B informs the MAC-d entity whether the data was received by the Node B prior to or following L1 synchronisation of the UE. In the event that the data was received prior to synchronisation, the data is discarded by the Node B and the MAC-d entity of the RNC requests more user data from the RLC and sends this new data to the Node B. This loss of data will increase the bit error rate (BER).

As well as a possible loss of data, a transport channel switch will inevitably result in an interruption in the transmission of data between the core network and the UE, as the UE, is "ordered" to stop listening to the pre-existing channel just prior to synchronisation being initiated. In the case of a switch from a common channel to a dedicated channel, this interruption is particularly undesirable as it occurs precisely at that time when traffic intensity is likely to be high (such a switch is triggered by increased traffic intensity or by an expected increase). The transmission interruption occurring during the switch from a FACH/RACH to a DCH is illustrated in the signalling diagram of FIG. 3.

STATEMENT OF THE INVENTION

It is an object of the present invention to overcome or at least mitigate the disadvantages of the currently proposed physical WCDMA L1 transport channel switching process. This and other objects are achieved at least in part by maintaining a pre-existing transport channel for a given UE during L1 synchronisation to a new channel.

According to a first aspect of the present invention there is provided a method of switching from a first to a second transport channel for User Equipment (UE) in a UMTS Terrestrial Radio Access Network (UTRAN) of a UMTS system, the method comprising:

(1) initiating a channel switch;
(2) initiating a synchronisation of the UE to the second channel;
(3) maintaining said first channel during the synchronisation phase such that data may be sent between the UE and UTRAN over the first channel during synchronisation; and
(4) terminating the first channel substantially immediately after synchronisation of the UTE to the second channel has been achieved and prior to the decoding of data sent over the second channel.

Embodiments of the present invention mitigate or eliminate the interruption in data transfer which may occur during a transport channel switch. Embodiments may also reduce the bit error rate resulting from a traffic channel switch, by avoiding the loss of data which occurs when data is sent on a new transport channel prior to synchronisation of the UE to the new channel.

The present invention is applicable in particular to the switch from a common traffic channel (e.g. FACH, RACH) to a dedicated channel (DCH). Although the invention is also applicable for a switch from a dedicated channel to a common channel, the advantages are not so great.

It will be understood that the MAC-d entity receives data, upon request, from a RLC entity of the serving RNC. Data to be sent to the UE is stored in one or more buffers of the RLC entity.

The controlling RNC and the serving RNC may be the same physical RNC. Alternatively, the controlling RNC may be a drift RNC, physically separate from the serving RNC.

According to a second aspect of the present invention there is provided a Radio Network Controller for use in a UMTS Terrestrial Radio Access Network (UTRAN) of a UMTS system, the RNC comprising a MAC-c entity arranged in use to maintain a pre-existing physical WCDMA L1 transport channel for a UE during a switch from that pre-existing channel to a new transport channel, and to terminate the pre-existing channel substantially immediately after the UE has been synchronised to the new transport channel and prior to the decoding of data sent over the new channel.

DETAILED DESCRIPTION OF A PREFERRED EMBODIMENT

Figure 1:
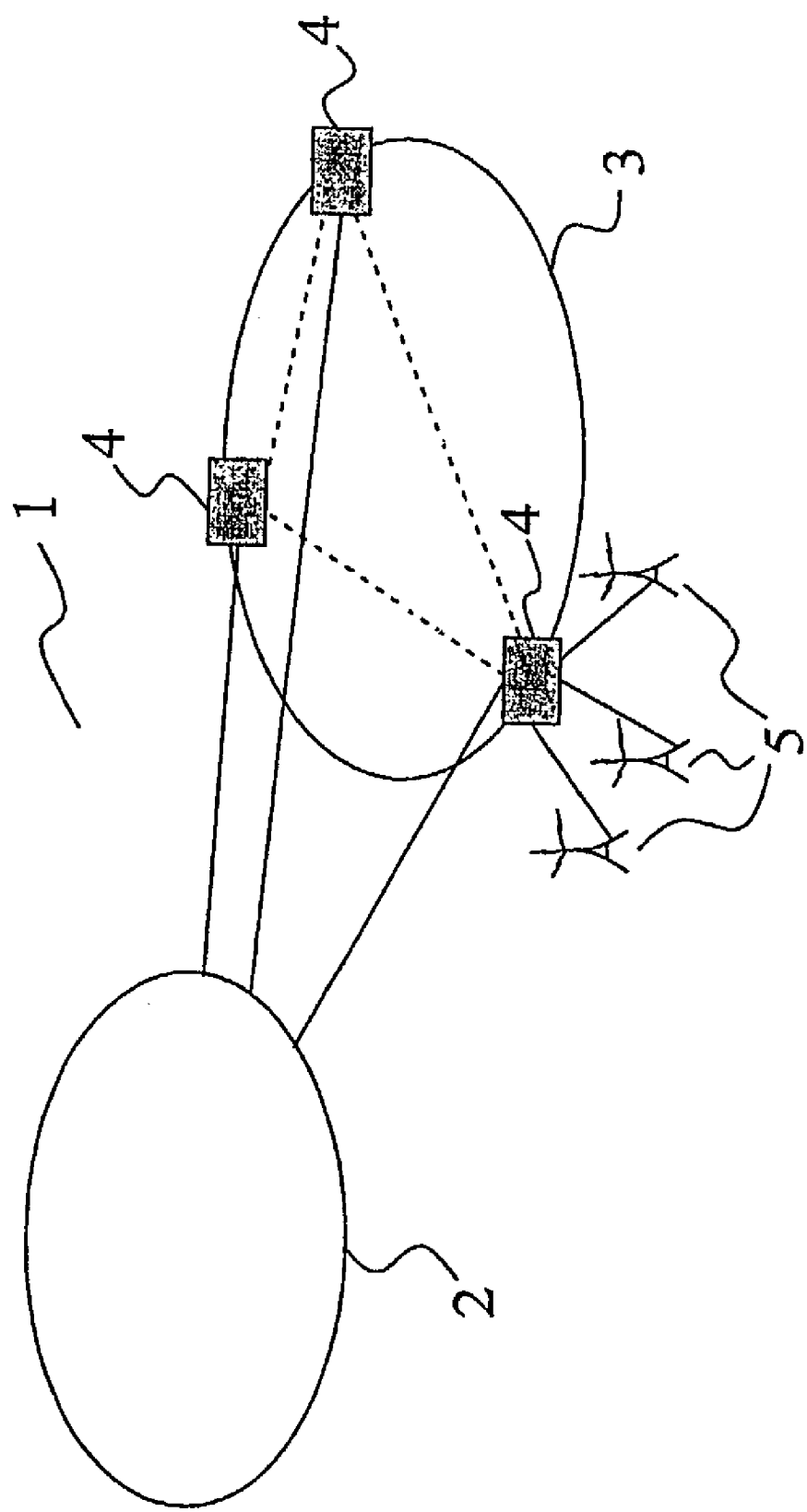
FIG. 1 illustrates schematically a UMTS network comprising a core network and a UTRAN.

The general structure of a UMTS network has been described above with reference to the schematic drawing of FIG. 1. Signalling associated with the switch from a common transport channel to a dedicated channel has been described with reference to FIG. 2.

Figure 2:
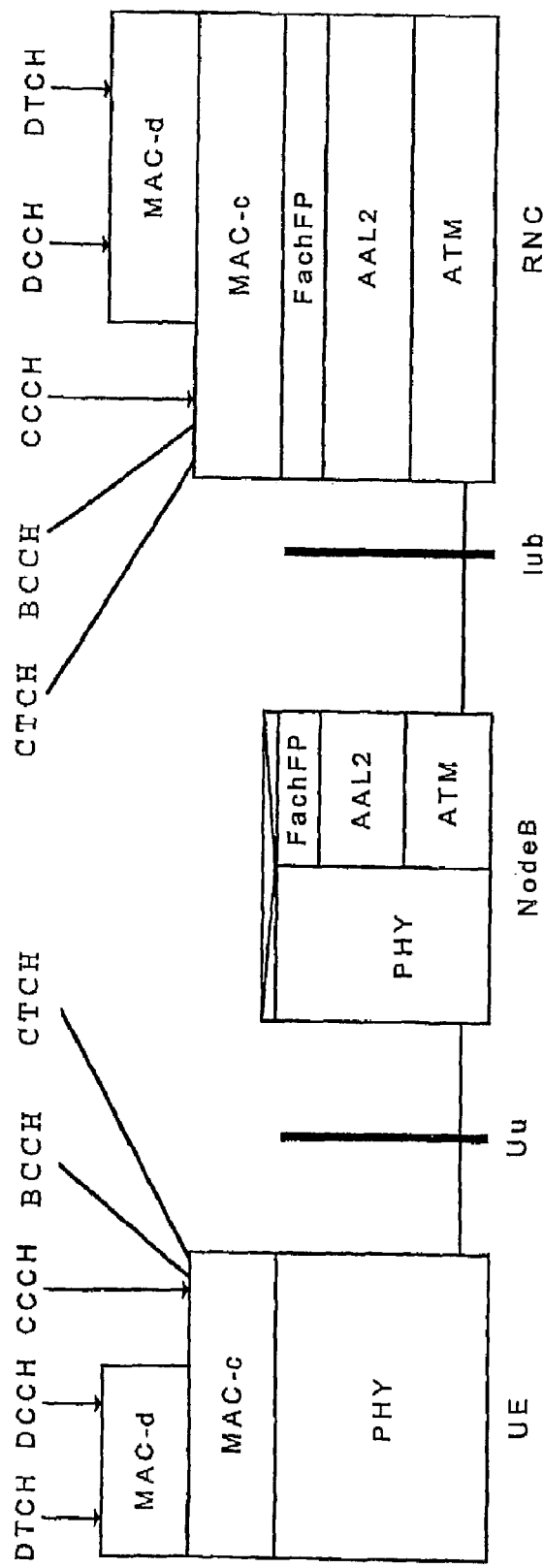
FIG. 2 illustrates the protocol architecture for a FACH transport channel of the UTRAN of FIG. 1.

Considering the scenario illustrated in FIG. 2, and considering the transfer of data in the downlink direction, signalling and user data packets destined for the UE are received at the MAC-d entity of the serving RNC from the core network and are "mapped" onto logical channels, namely a Dedicated Control CHannel (DCCH) and a Dedicated traffic CHannel (DTCH). The MAC-d entity constructs MAC Service Data Units (SDUs) comprising a payload section containing logical channel data and a MAC header containing amongst other things a logical channel identifier.

Assuming that a common (FACH) channel has been allocated to the UE, the MAC-d entity passes the MAC SDUs to the FACH Frame Protocol (FP) entity. This entity adds a further FACH FP header to each MAC SDU, the FACH FP header including a priority level which has been allocated to the MAC SDU by a Radio Resource Control (RRC) entity. The FACH FP entity then passes the SDUs to the Layer 1 entities for transmission over the Iub interface.

Figure 3:
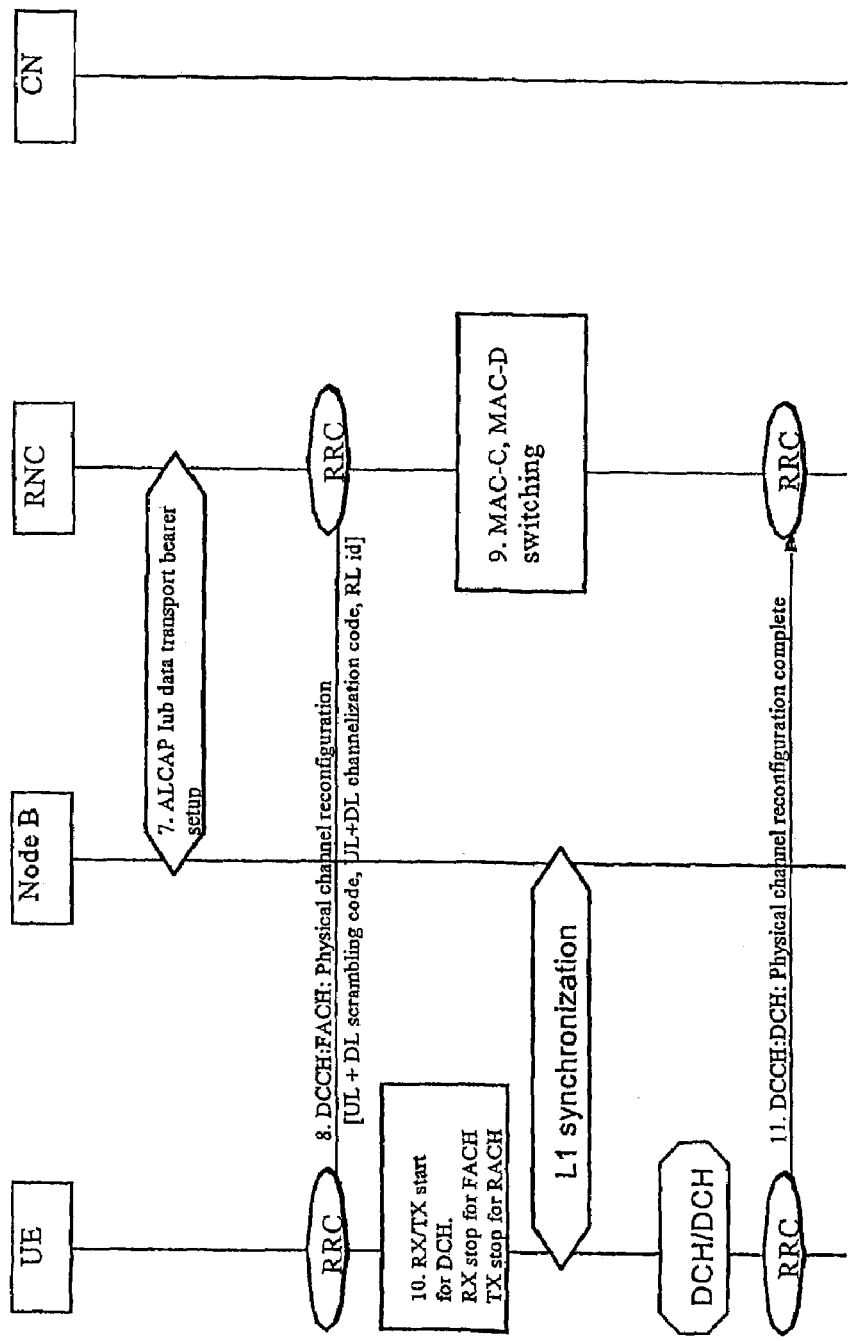
FIG. 3 illustrates signalling in the UTRAN related to a switch from a common to a dedicated channel.

For any one of a number of reasons (not considered in detail here), the MAC-c entity may decide to switch from a common channel (FACH) to a dedicated channel (DCH). The signalling related to this switch is illustrated in FIG. 3. A notification is first sent from the Radio Resource Control (RRC) entity of the RNC to a peer RRC entity of the UE, to inform the UE of the decision to switch channels. The UE then knows that the FACH channel is to be stopped, and a Layer 1 synchronisation made to the new DCH. This synchronisation may take several hundreds of milliseconds to complete.

Figure 4:
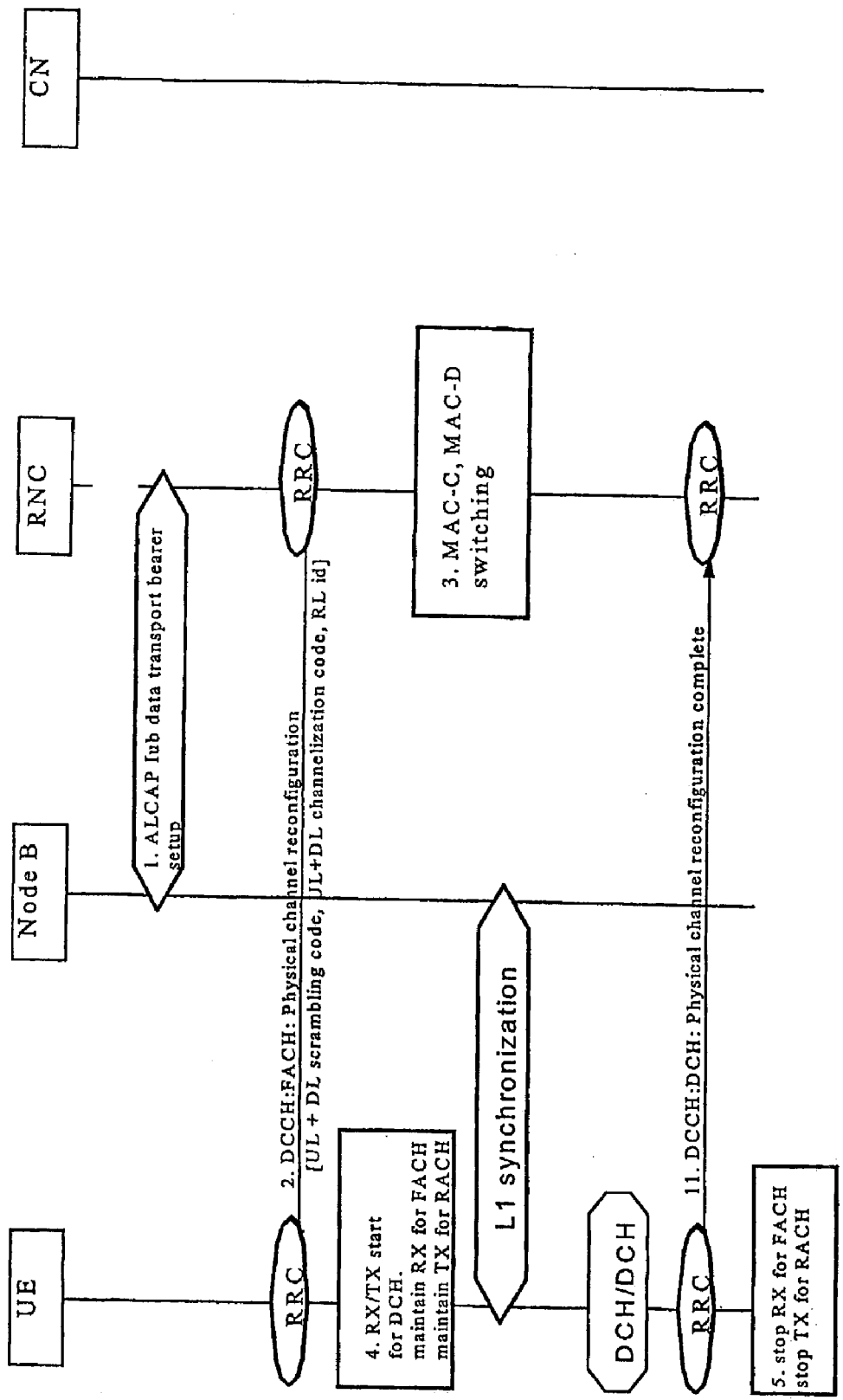
FIG. 4 illustrates signalling in the UTRAN related to a switch from a common to a dedicated channel according to an embodiment of the present invention.

In order to avoid any interruption in the transmission of data to the UE, the MAC-c entity maintains the FACH allocated to the UE. Contrary to the existing proposals, the UE continues to listen to that FACH after it has received the channel switch notification from the RRC, and during the subsequent L1 synchronisation phase. In order to implement this modification to the current proposals, modifications are required in the respective MAC-c and MAC-d entities of the UE and the RNC. Following the successful synchronisation of the UE to the DCH, the UE immediately ceases to listen to the FACH, and that channel is terminated by the MAC-c entity of the RNC. Thereafter, the UE listens only to the DCH. The signalling involved in this process is illustrated in FIG. 4.

Following the initiation of the channel switch, the RNC may begin sending MAC-d SDUs on the new DCH. Thus, for a while both the pre-existing FACH and the DCH may be in use. Of course, any SDUs sent on the DCH may be blocked at the Node B if they are received prior to synchronisation of the UE to the DCH.

Figure 5:
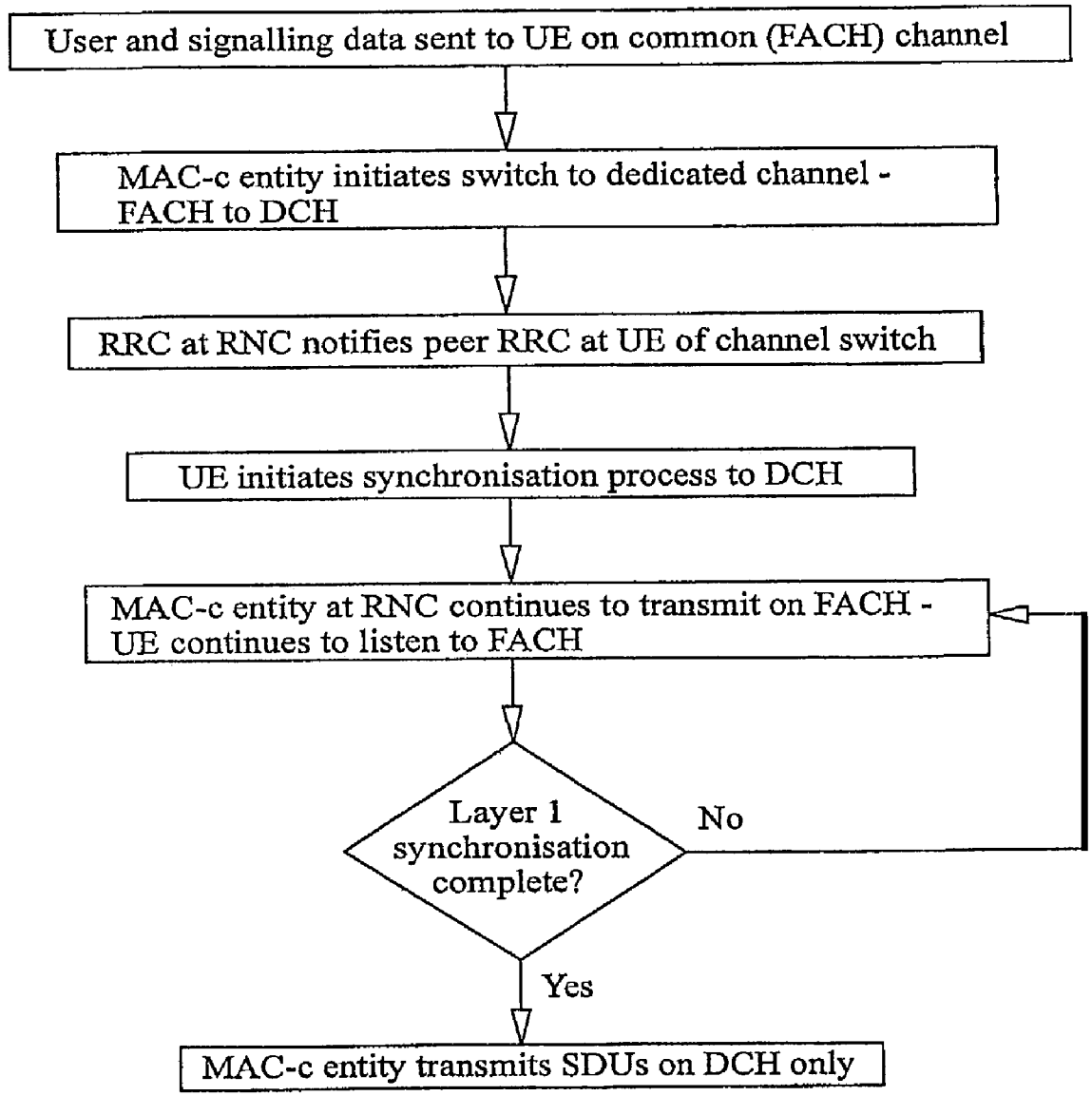
FIG. 5 is a flow diagram illustrating a process for switching from a common to a dedicated transport channel in the UTRAN of FIG. 1.

FIG. 5 is a flow diagram flirter illustrating this synchronisation process.

It will be appreciated by the person of skill in the art that various modifications may be made to the above described embodiment without departing from the scope of the present invention.

The invention claimed is:

1. A method of switching from a first to a second transport channel for User Equipment (UE) in a UMTS Terrestrial Radio Access Network (UTRAN) of a UMTS system, the method comprising:
   (1) initiating a channel switch;
   (2) initiating a synchronization of the UE to the second channel;
   (3) maintaining said first channel during the synchronization phase such that data may be sent between the UE and UTRAN over the first channel during synchronization, wherein the UE receives and decodes data received from the UTRAN while simultaneously synchronizing the UE to the second channel; and
   (4) terminating the first channel substantially immediately after synchronization of the UE to the second channel has been achieved and prior to the decoding of data sent over the second channel.

2. A method according to claim 1, wherein said channel switch is a switch from a common traffic channel to a dedicated channel.

3. A Radio Network Controller (RNC) for use in a UMTS Terrestrial Radio Access Network (UTRAN) of a UMTS system, the RNC comprising a Media Access Control-c (MAC-c) entity arranged in use to maintain a pre-existing physical Wideband Code Division Multiple Access (WCDMA) L1 transport channel for a UE during a switch from that pre-existing channel to a new transport channel, wherein the UE receives and decodes data received from the UTRAN over the pre-existing channel while simultaneously synchronizing the UE to the new channel and the MAC-c terminates the pre-existing channel substantially immediately after the UE has been synchronized to the new transport channel and prior to the decoding of data sent over the new channel.

* * * * *